UNITED STATES PATENT OFFICE 2,004,805

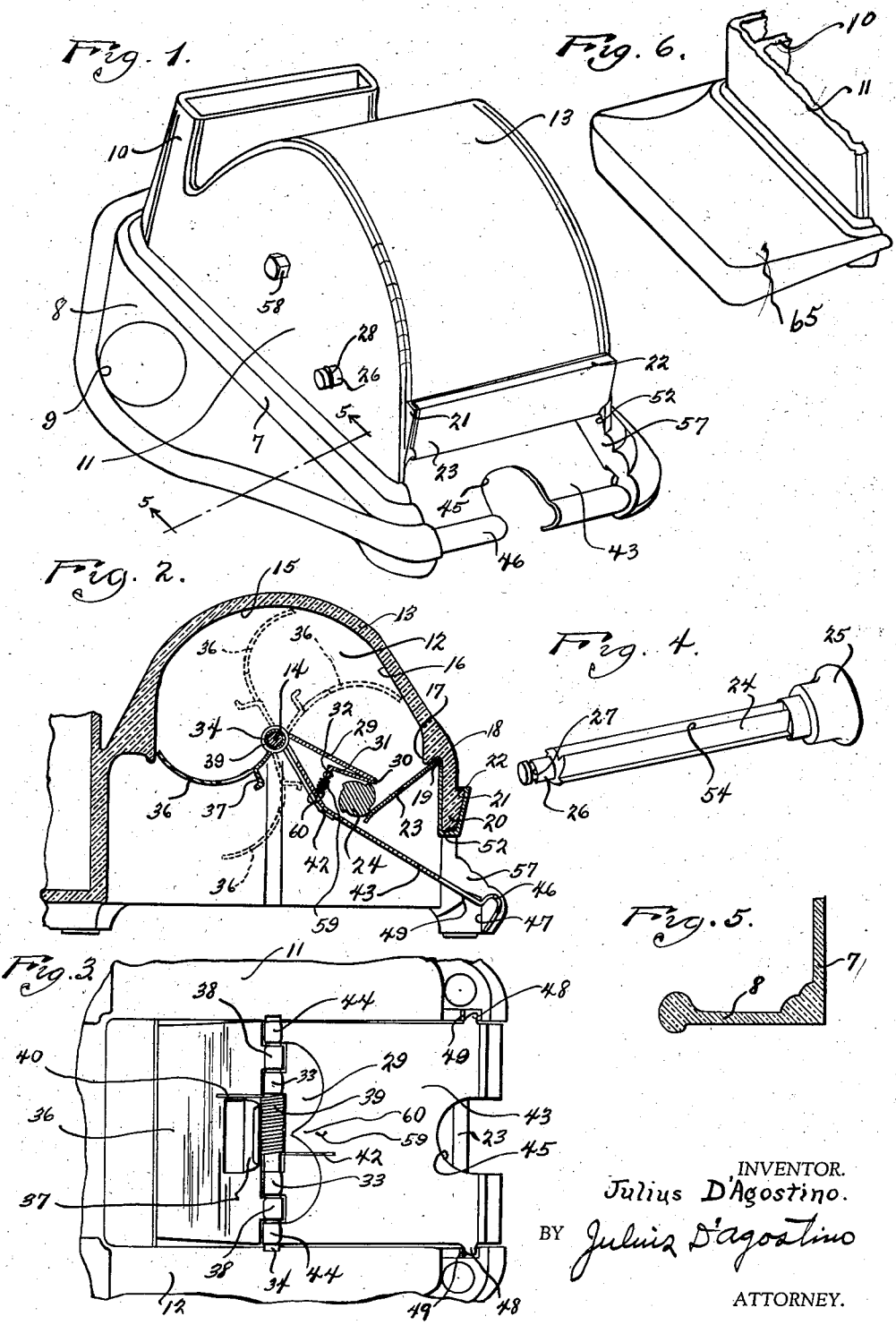

TOOTHPICK DISPENSER

Julius D'Agostino, Detroit, Mich.

Application January 10, 1933, Serial No. 651,016

7 Claims. (Cl. 312—84)

My invention relates to a new and useful improvement in a toothpick dispensing machine which will be economical of manufacture, durable, and highly efficient in use.

Another object of the invention is the provision in a toothpick dispensing machine of a coverless receptacle having an outlet feeding mechanism so arranged and constructed that the delivery of a single toothpick at a time may be assured.

Another object of the invention is the provision in the toothpick dispensing machine for a feeding mechanism of means whereby disarranged toothpicks are prevented from interfering with the normal functioning of the feeding mechanism.

Another object of the invention is the provision in a toothpick dispensing machine of a swingable spring-pressed feeding member which will serve to maintain the toothpicks in position for being fed from the receptacle and maintain the toothpicks in closely arranged position at all times.

Another object of the invention is the provision in a toothpick dispensing machine of a yieldable guard plate engageable with an ejecting mechanism so as to normally permit the passage of toothpicks into engagement with the ejecting mechanism and prevent undue discharge of the same from the receptacle.

Another object of the invention is the provision of a receptacle in a toothpick dispensing machine having a guard plate which may be easily and quickly mounted thereon and which is maintained in operative position at all times.

Another object of the invention is the provision in a toothpick dispensing machine of a receiving tray swingably mounted and which may be yieldably locked in operative position.

Another object of the invention is the provision in a toothpick dispensing machine of this class of a base having space thereon for reception of loose articles and provided with a receptacle for containing loose articles.

Another object of the invention is the provision of a toothpick dispensing machine of this class in which the receptacle and main body portion may be formed from transparent material such as glass or the like, and which will be provided with a surface on which advertising is to be displayed either within the receptacle or exterior of it.

Another object of the invention is the provision in a toothpick dispensing machine of a fluted or grooved ejecting mechanism adapted for efficiently ejecting toothpicks and yet simple in structure so that the same may be economically manufactured.

Other objects will appear hereinafter.

The invention consists in the combination and arrangement of parts hereinafter described and claimed.

The invention will be best understood by a reference to the accompanying drawing which forms a part of this specification, and in which, Fig. 1 is a perspective view of the invention.

Fig. 2 is a fragmentary sectional view taken longitudinally of the ejector.

Fig. 3 is a fragmentary bottom plan view of the invention.

Fig. 4 is a perspective view of the ejector used in the invention.

Fig. 5 is a fragmentary sectional view taken on line 5—5 of Fig. 1.

Fig. 6 is a fragmentary perspective view of a slightly modified form of the invention.

This application forms in part a continuance of my co-pending application Serial No. 499,020, filed Nov. 29, 1930.

The invention comprises a base 7, at opposite sides of which are outward projections 8, each having a recess 9 in which a loose article such as a salt cellar or the like may be positioned. Projecting upwardly from the rear of the base 7 is the cup shaped member 10 which may serve as a container for napkins, flowers, or the like. The superstructure is preferably formed integral with the base and constitutes a receptacle comprising the side walls 11 and 12 and the top wall 13, thus leaving the receptacle open at its bottom.

Projected through and mounted in the side walls 11 and 12 is a shaft 14. The inner surface 15 of the top wall 13 is curved and struck on a circle from the center of the shaft 14. This arcuate surface terminates in a tangental surface 16 extending downwardly to the lip 17 behind which is formed a recess 18. The wall 13 is downwardly turned to provide the ledge 20 which is increased in thickness to provide on the outer surface the shoulder 21. A metallic guard plate 23, preferably formed from resilient material is doubled upon itself to provide the edge 19 which engages in the recess 18. The end of the guard 23 is also doubled upon itself so as to embrace the ledge 20 and the extreme end 22 is angularly turned to lie upon the shoulder 21. The construction is such that the guard plate 23 may be very easily and quickly removed or pressed in position, by snapping the portion 22 over the shoulder 21 while the edge 19 is in engagement in the groove or recess 18. The wall 13 terminates upwardly of the base so as to leave a space or opening 52 at the forward end of the receptacle.

An ejector 24 is journaled in the side walls 11 and 12 and provided at one side with a knob 25. The opposite end is reduced as at 26 and projected through the wall 11. A peripheral groove 27 is formed in this reduced portion 26 in which a locking ring 28 may engage to lock the device in position. By gripping the knob 25, which is exterior of the wall 12, the ejector may be rotated. This ejector constitutes an elongated body or shaft which is fluted or provided with grooves 54 extending longitudinally thereof. These grooves are of sufficient depth and spaced a sufficient distance apart as to permit a toothpick being engaged individually by the grooves while the ejector is being rotated though the ejector is still of very simple construction and easily die-cast.

A deflector plate 29 is angularly turned upon itself to provide a portion 31, the end of which is again angularly turned to extend downwardly as at 32 below the top of the ejector. The portion 31 rests upon the ejector and the edge 30 projects forwardly beyond the center of the ejector 24. The construction is such that this plate is formed U shaped in cross section and the U shaped structure overlies the longitudinal axis of the ejector. It is important that the edge 30 extend forwardly in this manner in order to prevent a clogging of the ejecting mechanism when the ejector is being rotated. Should, however, a toothpick in disarranged position be carried by the ejector rearwardly and beneath the angularly turned portion 31, it will be brought into engagement with the angularly turned portion 32 and thus straightened so as to extend longitudinally of the ejector or in proper position for passage downwardly to the outlet opening.

This plate 29 is swingably mounted by means of the knuckles 33 which are formed from tongues extending outwardly from one side of the member 29 and through which is extended a sleeve 34 which embraces the shaft 14. While the device is in upright position or while the toothpicks are in the receptacle, the portion 31 will be maintained closely engaged against the ejector and yet rockably upward therefrom to permit the passage of a toothpick thereunder which may be carried by the ejector.

A presser member 36 which is formed arcuate in cross section is provided with knuckles 38 which embrace the sleeve 34 and whereby this presser member is swingably mounted on the sleeve 34. A gripping tongue 37 is punched outwardly from the presser plate 36. A spring 39 embraces the sleeve 34, and one end 40 of this spring engages the presser plate 36 and has a tendency to rock the same on the sleeve 34 as an axis into the lower-most right hand position shown in dotted lines in Fig. 2.

In order to place the toothpicks in the receptacle, the presser plate 36 is swung counterclockwise to the dotted line position shown in Fig. 2, so as to permit deposit of toothpicks into the receptacle when the same is inverted. Upon the release of the presser member 36, the spring 39 will serve to move this presser member into engagement with the toothpicks in the receptacle and cause the movement of this presser member clockwise into the various dotted line positions shown in Fig. 2 so as to carry the toothpicks around and permit their deposit upon and press the same against the members 29 and 23.

A receiving or collection plate 43, preferably made from metal or other material is provided with the knuckles 44 which embrace the sleeve 34. This receiving plate 43 extends downwardly below the ejector and forwardly in the opening 52. Its forward end is semi-round, angularly turned to provide a bead 46, the forward edge of this receiving plate 43 being cut away as at 45. Each of the side walls is provided with forward projections 57 forming a moulded base line; on the inner surface of each of which is provided a recess 47 to form shoulders 49 behind which are adapted to engage latterly projecting lugs 48 on the plate 43. The opposite end 42 of the spring 39 serves to normally retain this receiving plate 43 in position shown in Fig. 2 with the lugs 48 positioned above and behind the shoulders 49. In order that these lugs 48 may pass behind the shoulders 49, a springing of the plate 43, which is preferably formed from resilient material is necessary.

In operation as the toothpicks are pressed toward the members 29 and 23 by the presser 36 when the ejector is rotated, a toothpick engaging in one groove 54 will be deposited upon the receiving plate 43 and permit it to slide downwardly, and it engages the rib or bead 46. The cut away portion 45 lends an easy gripping of the toothpick when the same is resting against the bead 46. By continued turning of the ejector, additional toothpicks may be deposited upon the receiving plate 43.

In assembly, the deflector plate 23 would first be snapped into position and then the ejector would be mounted in position. The remaining parts would then be assembled on the sleeve 34, and this sleeve 34 would then be inserted into the receptacle forming portion, and the shaft 14 projected through the side walls and through the sleeve.

A coil spring 59 is connected at one end to the bent end 32 of the plate 29, and at its opposite end to the point 60 of the receiving plate 43 so as to maintain the plate 29 pressed against the ejector 24 and maintain close contact therewith at all times while at the same time permitting this plate 29 to be raised upwardly to permit the passage of the toothpicks thereunder. A nut 58 is threaded on one end of the shaft 14. In this way the various parts may be easily and quickly assembled. After assembly, the presser member 36 may be pulled downwardly from the position shown in full lines in Fig. 2, and the receptacle forming portion inverted to receive the toothpicks by having the receptacle open at the bottom and entirely closed at the top. It is obvious that the toothpicks are shielded from dust, dirt, or liquids and the like, and a neat and attractive device is afforded.

In the modified form shown in Fig. 6 one of the outward projections 65 is formed to constitute a change tray.

When the device is made from glass or other transparent material, the toothpicks will be visible, which is also an attractive feature of the structure. From the description given, however, it is obvious that if desired the superstructure may be made from material other than glass or transparent material.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. In a toothpick dispensing machine of the class described, a rotatable toothpick ejecting member for carrying a toothpick to an outlet opening; an inclined deflecting plate overlying said ejecting member and engaging its periphery and projecting across its longitudinal axis and terminating within the marginal limits thereof; and depending means on said deflecting plate in spaced relation to said ejecting member and adapted for engaging a disarranged toothpick carried by said ejecting member and preventing discharge of the same from the ejecting member in disarranged position.

2. In a toothpick dispensing machine, a toothpick receiving receptacle closed at all sides except the bottom and having an outlet opening at one side; a shaft projected through said receptacle between the top and bottom thereof; a receiving plate inclined downwardly from said shaft and extending to the opening bearing side below the opening and forming at one side of said shaft a bottom for the toothpick receiving portion of said receptacle; and a swingable presser member extending outwardly from said shaft in the opposite direction for forming at said side of said shaft, the bottom of the toothpick receiving portion of said receptacle.

3. In a toothpick dispensing machine, a toothpick receiving receptacle closed at all sides except the bottom and having an outlet opening at one side; a shaft projected through said receptacle between the top and bottom thereof; a receiving plate inclined downwardly from said shaft and extending to the opening bearing side below the opening and forming at one side of said shaft a bottom for the toothpick receiving portion of said receptacle; a swingable presser member extending outwardly from said shaft in the opposite direction for forming at said side of said shaft, the bottom of the toothpick receiving portion of said receptacle; an ejector mounted in said receptacle above said receiving plate; a guard plate in said receptacle for directing toothpicks toward said ejector and preventing passage on to said receiving plate; and a deflecting plate overlying said ejector and extending across its longitudinal axis for deflecting toothpicks on to said guard plate, said ejector being adapted upon rotation for carrying a toothpick and depositing the same upon said receiving plate.

4. In a toothpick dispensing machine, a toothpick receiving receptacle closed at all sides except the bottom and having an outlet opening at one side; a shaft projected through said receptacle between the top and bottom thereof; a receiving plate inclined downwardly from said shaft and extending to the opening bearing side below the opening and forming at one side of said shaft a bottom for the toothpick receiving portion of said receptacle; a swingable presser member extending outwardly from said shaft in the opposite direction for forming at said side of said shaft, the bottom of the toothpick receiving portion of said receptacle; an ejector mounted in said receptacle above said receiving plate; a guard plate in said receptacle for directing toothpicks toward said ejector and preventing passage on to said receiving plate; a deflecting plate overlying said ejector and extending across its longitudinal axis for deflecting toothpicks on to said guard plate, said ejector being adapted upon rotation for carrying a toothpick and depositing the same upon said receiving plate; and resilient means for pressing said presser member across the toothpicks for forcing the same toward said guard plate and said deflector.

5. In a toothpick dispensing machine, a receptacle closed on all sides except the bottom and provided at one end with an outlet opening; a shaft projected through said receptacle between its top and bottom; a receiving plate swingably mounted on said shaft and projecting downwardly from one side thereof to the side of said receptacle below said opening, the side walls of said receptacle at said opening having recesses formed therein to provide engagement shoulders; and outwardly projecting lugs on said receiving plate for engaging behind said shoulders and resisting displacement of said receiving plate, said receiving plate serving as a closure for one side of said receptacle extending downwardly from said shaft.

6. In a toothpick dispenser of the class described, a receptacle having an opening at one side; a lip on the inner side of said receptacle above said opening projecting inwardly to provide a recess behind the lip; a ledge on the outer surface of said receptacle above said opening to provide a horizontally disposed shoulder; a guard plate doubled upon itself and engaging at its doubled over edge in the recesses behind said lip, said lip engaging the face of said guard plate to provide a seal against toothpicks entering around said recess, said guard plate being doubled around said edge and having an angularly turned end lying in engagement with the shoulder on said ledge.

7. In a toothpick dispensing machine of the class described, a receptacle closed on all sides except its bottom and provided with an outlet opening; a shaft projected through said receptacle; a tubular sleeve embracing said shaft; closure members swingably mounted on said sleeve for closing the bottom of the toothpick receiving compartment; and a deflecting plate swingably mounted on said sleeve, said parts being capable of being assembled on said sleeve prior to insertion into said receptacle.

JULIUS D'AGOSTINO.